United States Patent [19]
Hong

[11] Patent Number: 5,262,866
[45] Date of Patent: Nov. 16, 1993

[54] METHOD FOR DISPLAYING A PLURALITY OF SEQUENTIAL VIDEO IMAGES IN A MULTI-SCREEN PICTURE

[75] Inventor: Seung-Ho Hong, Suwon, Rep. of Korea

[73] Assignee: SamSung Electronics Co., Ltd., Rep. of Korea

[21] Appl. No.: 815,528

[22] Filed: Jan. 2, 1992

[30] Foreign Application Priority Data
Jan. 25, 1991 [KR] Rep. of Korea .................. 1991-1294

[51] Int. Cl.$^5$ .................. H04N 5/262; H04N 5/268; H04N 5/272
[52] U.S. Cl. .................. 358/183; 358/181; 358/22
[58] Field of Search .................. 358/22, 183, 181, 450, 358/147; 340/717, 721

[56] References Cited
U.S. PATENT DOCUMENTS

| | | | |
|---|---|---|---|
| 4,855,833 | 8/1989 | Kageyama et al. | 358/183 |
| 5,093,726 | 3/1992 | Chun | 358/183 |
| 5,144,438 | 9/1992 | Kim | 358/183 |
| 5,161,012 | 11/1992 | Choi | 358/183 |

FOREIGN PATENT DOCUMENTS
258180 11/1991 Japan .................. 358/147

Primary Examiner—Edward L. Coles, Sr.
Assistant Examiner—Scott A. Rogers
Attorney, Agent, or Firm—Robert E. Bushnell

[57] ABSTRACT

In a method for displaying the multi-screens of a video color printer, automatic strobe key input is checked during a multi-screen mode by processing key input. If the strobe key is selected, a set time increment is provided by a user, divided by thirteen and stored. A memory enable signal is generated according to the divided set time increment so as to read/write 13 screens continuously within the entered set time increment. Further, the 13th screen is processed n times larger than the other screens of multi-screens.

15 Claims, 4 Drawing Sheets

METHOD FOR DISPLAYING A PLURALITY OF SEQUENTIAL VIDEO IMAGES IN A MULTI-SCREEN PICTURE

BACKGROUND OF THE INVENTION

The present invention relates to a method for displaying multi-screens in a video color printer, and particularly to a method for taking a close-up of a core screen by automatic strobing in displayable and printable multi-screens by momentarily seizing multi-screens at a continued pace, taking advantage of 13 screens and automatic strobing function but largely seizing the core screen being the last picture among the 13 screens in memorizing and printing multi-screens.

The term "video printer" usually refers to a device which stores video signals in a memory such as a field memory, or a frame memory, by converting the video signals into digital signals, and prints a picture represented by those stored digital signals. Specifically, video printer devices are being developed for recording selected portions of the video signals or for printing pictures reproduced on a monitor which were recorded with a device such as a still camera.

Multi-screens comprising nine pictures such as in FIG. 3 are formed and displayed on a monitor 40 from video data recorded in the video memory part 20 in a conventional system such as FIG. 1. The video data is displayed in each region of FIG. 3 in response to the RD/WR control signal of FIG. 2 generated by the read/write signal generation part 50 and the address signal generated by the address signal generation part 110 which are each received by the video memory part 20. The video data supplied from the video memory 20 is encoded in the encoder 30 and then displayed on the monitor 40.

Now, a more detailed explanation will be given with reference to FIGS. 1 to 3. When a user inputs a multi key, a step key, a time setting key and a strobe key in sequential order with the key input device 70, the microcomputer 60 recognizes the key input with a key processing routine. For instance, the step key is a sequential multi-screen selection key, the memory key functions to record and display pictures in the nine divided regions of the displayed image every time it is selected and the strobe key controls formation of the multi-screen continuously. When nine screens are selected with the step key, signals indicative of the nine screen selection are supplied through the ports P2-P4. Since there are three ports, in 6 to different multi-screen modes may be indicated. For instance multi-screen modes in which 1, 4, 9, 13, 16 and 25 mode screens are simultaneously displayed are possible with different combinations of signals on the three ports. The multi-screen setting part 80 controls an address setting part 100 and a sequential-screen setting part 90 in response to which of the six multi-screen modes is indicated. Here, let it be assumed that the multi-screen setting part 80 received signals indicative of a multi-screen mode with nine pictures. At this time, the multi-screen setting part 80 controls the address setting part 100 and the sequential screen selection part 90. The sequential screen selection part 90 generates first point data, namely, PT1-PT9, for a divided screen as shown in FIG. 3. When the first point data from the sequential screen selection part 90 for each screen of multi-screens and the 9-screen dividing information of multi-screens setting part 80 are inputted to the address setting part 100, addresses are generated for each point of the divided screen as shown in FIG. 3 so as to 9 become a number designating signal in the video memory part 20.

For example, when it becomes PTn(mo)=PT1(0,0), pt2(0.3), PT3(0.6) ... PT9(9.0) in FIG. 3, the sequential screen selection part 90 generates m, n values. The m, n values and multi 9 screen selection information of the multi-screen setting part 80 are provided to the address setting part 100, the address setting party 100 decodes and provides first addresses to the address signal generation part 110. The address signal generation part 110 increments the first addresses, beginning with the of the sequential screen selection part 90, and provides the incremented addresses to the video memory part 20 to access the digital video stored in the data video data input part 10 according to the read/write signal generation part 50.

According to the output signal of the address setting part 100, the address signal generation part 110 increases the addresses sequentially so that video data received through the video data input part 10 is stored in corresponding parts of the divided video memory part 20 of FIG. 3.

On the other hand, a read/write signal RD/WR is generated by the read/write signal generation part 50 shown in FIG. 2 and provided to the video memory part 20 when a memory enable signal ME from the microcomputer 60 is generated as shown in FIG. 2 and provided to the read/write signal generation part 50. If the step key is selected at this time, the memory enable signal ME is generated by the microcomputer 60 each time the step key is selected and the first point designating signal is generated by the sequential screen selection part 90 in response to the control of multi-screen setting part 80 and 9 screens are thereby formed in sequential order. When the strobe key is inputted, the signal is automatically generated at a continued pace and formed into 9 screens. And, when the video memory part 20 reads/writes the video data received from the video data input part 10 according to each divided region of FIG. 3, a write mode is enabled for each video in response to a low level of the read/write signal RD/WR in FIG. 2 and records the video data according to the address signal supplied from the address signal generation part 110 and then enables a read mode in response to high levels of the read/write signal. The read data is displayed to the monitor 40 after being encoded in the encoder 30.

Therefore, in order to process the video data inputted through the video data input part 10 in the video memory part 20, it is decisively controlled by the outputs of read/write control part 50 and address signal generation part 110. The accessing velocity of the video memory part 20 is determined by the set time of keyboard part 70 inputted to the microcomputer 60.

The above-described video printer has been disclosed in patent application No. 4467/1989 on Apr. 4, 1989 in Korea by the present applicant.

As described hereinabove, it has been heretofore possible to display continuous momentary actions fragmentarily or automatically with a memory key or a strobe key but, when a user intends to momentarily display or print, for example, a golf swing of a golf player or a baseball game, it is difficult for a user to momentarily display a desired posture in one screen among multi-screens because set time is designated to one and it is also difficult for him to distinguish one from another because the desired picture is small in size.

SUMMARY OF THE INVENTION

It is therefore an object of the present invention to provide a method which makes it possible to momentarily seize a desired picture at a desired time by adjusting set time and to display and print a core screen by rendering it larger than the size of other screen among multi-screens by an automatic strobe function.

DETAILED DESCRIPTION OF THE INVENTION

Figure 1:
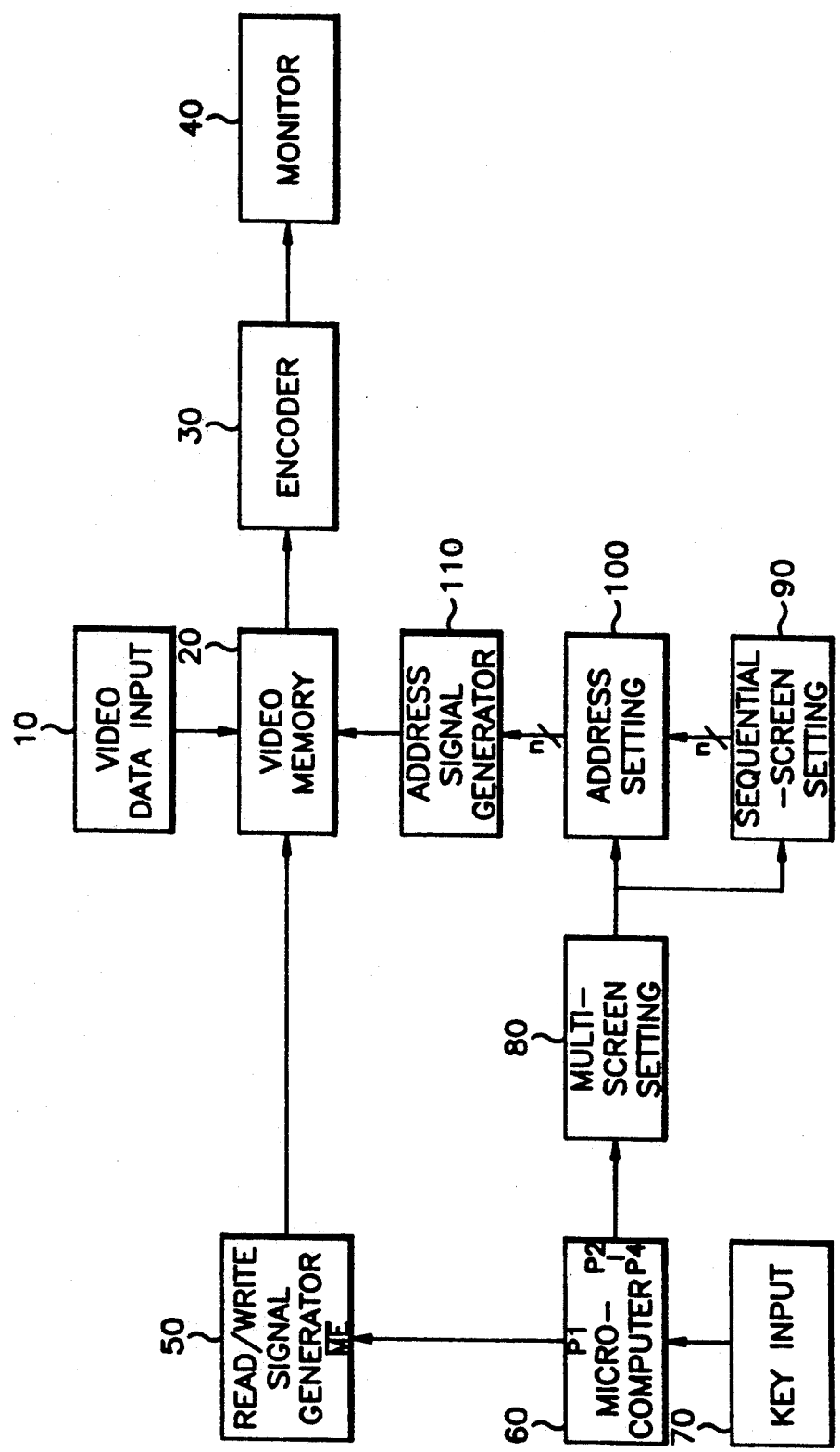
FIG. 1 is a systematic diagram for carrying out the present invention.
Figure 2:
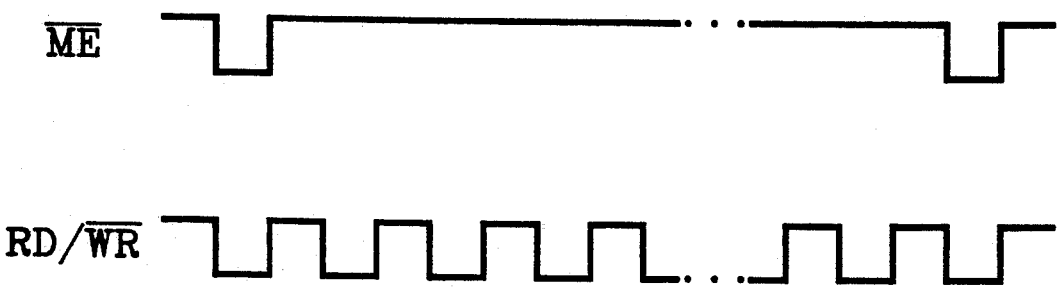
FIG. 2 shows control signals waveform for accessing the video memory part 20 of FIG. 1.
Figure 3:
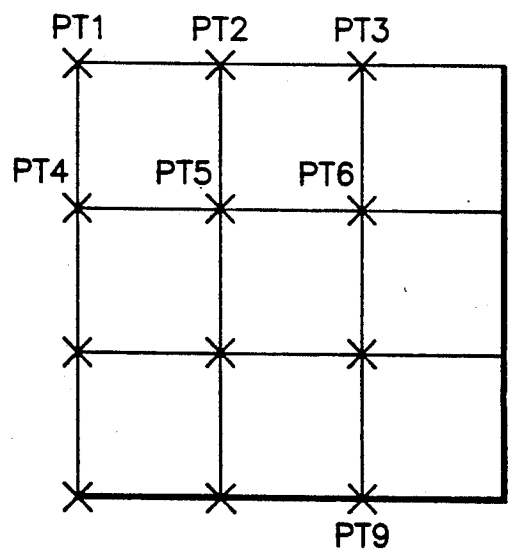
FIG. 3 is an illustrative view showing 9 screens in multi-screens.

The present invention will now be described in detail by referring to the drawings attached hereto.

Figure 4A:
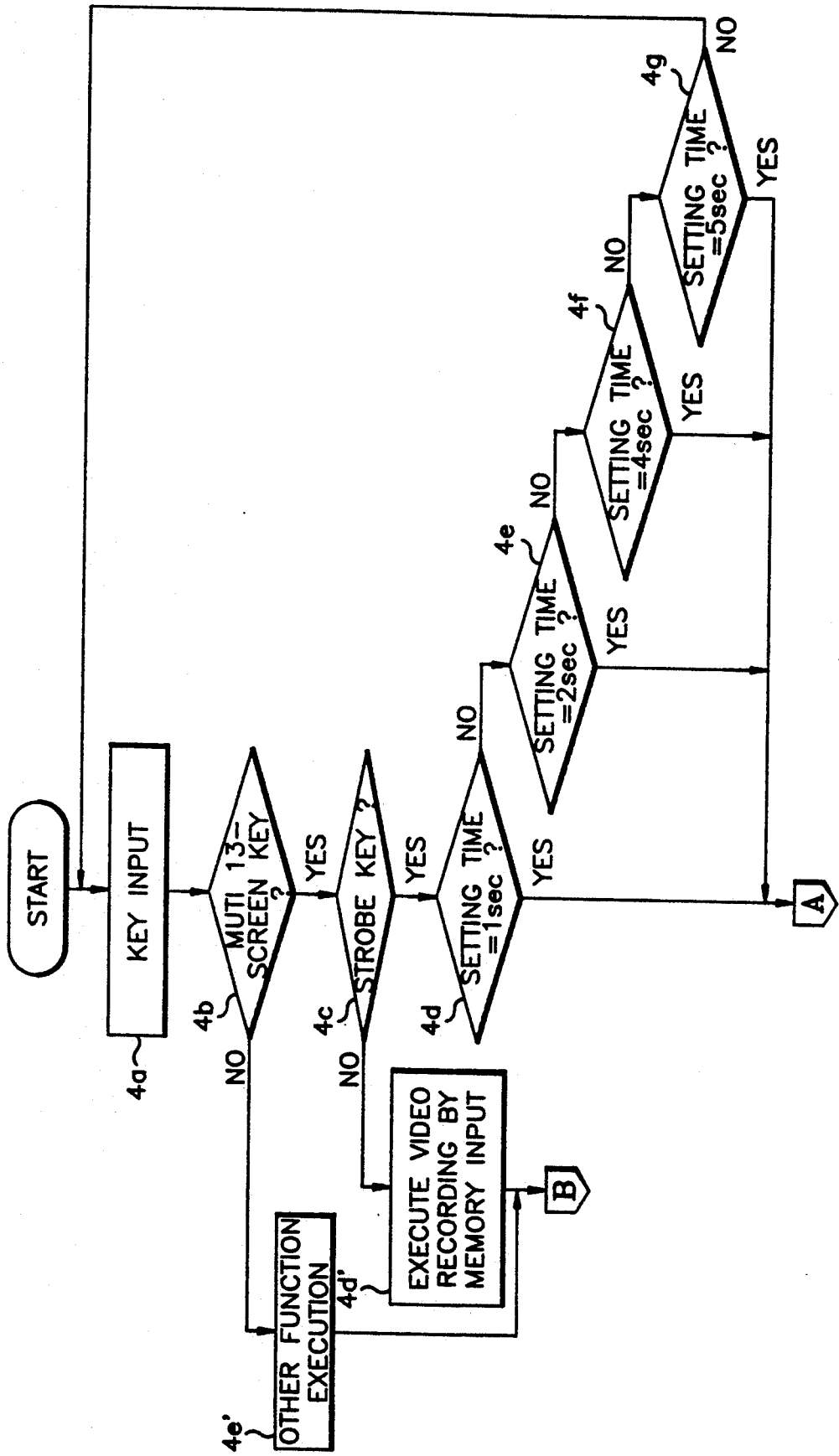
FIGS. 4A and 4B are a flowchart according to the present invention.
Figure 4B:
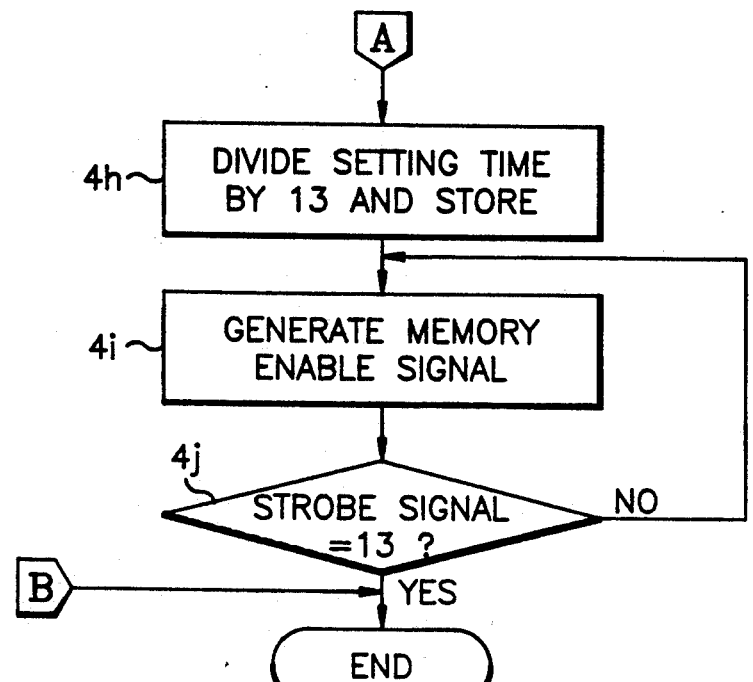

Turning now to the drawings, FIGS. 4A and 4B illustrate a flowchart according to the present invention, in which a first step involves checking for selection of an automatic strobe key during a multi-screen mode, a second step involves performing other functions and recording a picture resultant from selection of a memory key when a multi-screen and strobe mode is not invoked in the first step and checks if a time increment should be set in the multi-screen and strobe mode, a third step checks the set time increment in the 13-screen strobe mode of the second step, a fourth step stores the set time increment checked in the third step after dividing the set time increment into 13, and a fifth step displays and prints a memory enable signal by generating it according to the value calculated from the set time increment in the fourth step and controlling memory enable signal so as to read/write 13 screens continuously but processes the 13th screen n times as large as other screens or multi-screens.

Figure 5:
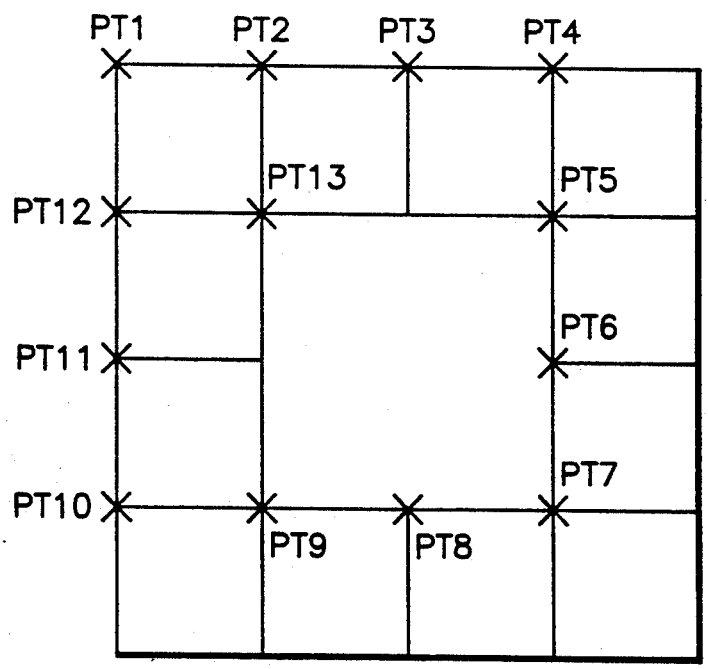
FIG. 5 is an illustrative view showing 13 screens in multi-screens.

FIG. 5 is an illustrative view showing that multi-screen image having 13 thirteen screens according to the present invention. Now, one concrete embodiment of the present invention will be described in detail by referring to FIGS. 1, 2, 4A, 4B and 5.

A VTR is connected to the multi-screen source. A multi-screen mode having thirteen screens (multi-13) is mode selectable by the user through the key input part of video color printer. The microcomputer 60 detects key selections in step 4a with a key processing routine and checks if a multi 13 key is selected. If multi-13 key is selected, the microcomputer 60 outputs mode signals indicative of the multi-13 mode through the ports P2–P4. The mode signals are decoded in the multi-screen setting part 80 which generates a 13-screen selection signal. The 13-screen selection signal is received by the address setting part 100 and sequential screen selection part 90. The sequential screen selection part 90 generates the first point signals PT1–PT13 for the 13 screens as in FIG. 5 in sequential order.

When the 13-picture selection signal of the multi-screen setting part 80 and the first point signals from sequential screen selection part 90 are received by to the address setting part 100, the address setting part 100 individually generates each first signal point PT1–PT13 for multi 13 screens and, when those outputs are received by the address signal generation part 110 increases the address for multi 13 screens, beginning with the first point PT1–PT13 as shown in FIG. 5, and generates an address data of each divided screen in the video memory part 20.

When the strobe key and set time are inputted in the above condition, the microcomputer 60 checks if it is a strobe key in step 4c and checks if the set time increment is 1 to 5 seconds in steps 4d–4g.

The processing of the steps 4b–4g is set as flag if recognized according to the key input routine by placing a key input flag register in the internal RAM region of microcomputer 60. The microcomputer 60 retrieves the flag and executes corresponding functions while going through the steps 4b–4g.

After dividing the time set increment in the steps 4d–4g into 13 and storing the result as a strobe time in step 4h, the microcomputer 60 generates a memory enable signal ME for strobe to the port P1 13 times in step 4i according to the stored value. When the read/write signal generation part 50 generates a memory read/write control signal for the 13 pictures of FIG. 5 according to the memory enable signal ME and it is inputted to the video memory part 20, the video data of video data input part 10 inputted sequentially according to the address provided by the address signal generation part 110 is read/written. The access motion of the video memory part 20 is the same as disclosed in the conventional art. However, the read/write control of the 13th picture data is able to form a picture larger than the length of data time generated by the address signal generation part 110.

Meanwhile, the microcomputer 60 checks in step 4j if a strobe signal is inputted 13 times in step 4i according to the internally counted value and repeats its checking until the memory enable signal ME is outputted 13 times in the step 4i, if the strobe signal is not generated 13 time, and finishes its checking at the 13th time. But, if the screen processed into the 13 screens is not a desired swing posture by looking at the monitor 40, the key input part 70 designates the set time again. For example, in order to seize a swing condition previous to the present condition in the 13th screen, it will do if quick time is selected. In order to seize subsequent swing conditions, it will do if slow time is selected. The reason is that if operation is performed in step 4h according to the selected value, the width of strobe time becomes long or short, and so the generation time of memory enable signal ME is controlled and a desired screen can be easily brought into relief by being largely replaced as the 13th screen.

In other words, if a user sets a multi 13 screen mode, the microcomputer 60 judges its signal and supplies a 13-screen setting signal to the multi-screen setting part 80 and receives this signal at the sequential screen selection part 90 and sets "x" addresses shown in FIG. 5 together with the signal supplied from the multi-screen setting part 80. According to the output of the address setting part 100, the microcomputer 60 sends the signal to the address signal generation part 110 and generates an address data for the 13 screens of FIG. 5. Thereafter, if the user presses a strobe key and sets the amount of a video signal screen should be memorized into 13 screens, the microcomputer 60 counts the set time and inputs the memory write signal of video memory part 20 to the sequential screen selection part 90 through the read/write signal generation part 50 and a multi-screen setting part 80 every time it divides said set time into 13 and memorizes the moments of each continuous motion for multi-screens. As to movement from 1 to 2 screen, if a signal is generated from the sequential screen selection part 90 in keeping with a strobe signal, the number setting part 100 is so arranged as to set 2 screen number after 1 screen number after 1 screen.

When each time (set time 13) of strobe signal is fixed optionally, there arises an instance where pictures are distorted or synchronism is not agreeable, and therefore a strobe signal must be repeatedly generated for every field or every n fields.

As heretofore described, the present invention has the advantage of being not only able to throw only a core screen into relief by taking a close-up of last screen but also able to automatically divide, display and print a video screen by the microcomputer if the user looks at it and sets time.

What is claimed is:

1. In a method for displaying multi-screens of a video color printer, a method for taking a close-up of a core screen by automatic strobing in the multi-screens, said method comprising:
   checking for user selection of an automatic strobe key for enabling an automatic strobe mode during a multi-screen mode;
   executing other functions and recording a screen in response to a memory key input if said multi-screen mode and said automatic strobe mode are not enabled;
   if said automatic strobe mode and said multi-screen mode are enabled, enabling user selection of a set time increment for the automatic strobe mode;
   dividing the set time increment by thirteen and storing a result of said dividing; and
   displaying a multi-screen video image comprising thirteen screens representative of video signals from a single video signal source, a time differential between successive ones of said thirteen screens being determined in response to said result of said dividing.

2. A method for displaying a multi-screen video image, said method comprising:
   checking for user selection of an automatic strobe key for enabling an automatic strobe mode during a multi-screen mode;
   if said automatic strobe mode and said multi-screen mode are enabled, enabling user selection of a set time increment for said automatic strobe mode;
   receiving consecutive frames of video signals from a single video signal source and storing a plurality of said frames received within a time period determined by said set time increment; and
   displaying the stored frames simultaneously as a multi-screen video image on a single video display.

3. A method as claimed in claim 2, wherein time period between storage of consecutive ones of the stored frames is a function of said set time increment and a total number of said frames to be stored.

4. A method as claimed in claim 3, wherein said total number is thirteen.

5. A method as claimed in claim 2, wherein time periods between storage of consecutive ones of the stored frames are equal to said set time increment divided by a total number of said frames to be stored.

6. A method as claimed in claim 2, wherein one of the displayed said stored frames is larger than remaining ones of the displayed said stored frames.

7. A method as claimed in claim 1, wherein one of the displayed said thirteen screens is larger than remaining ones of the displayed said thirteen screens.

8. A method as claimed in claim 2, wherein enabling user selection of said set time increment comprises displaying a plurality of selectable time periods.

9. A method as claimed in claim 6, wherein a first and larger one of the displayed frames is displayed in a center region of said single video display while remaining ones of the displayed frames are displayed around a periphery of said larger one.

10. A video color printer, comprising:
    memory means for storing frames of received video signals in response to write enable signals, and for providing the stored frames in response to read enable signals and addresses;
    display means for displaying said stored frames provided by said memory means as a multi-screen display;
    control means for receiving a user selected set time increment, for generating said write enable signals so that a time period between storage of consecutive ones of the stored frames by said memory means is a function of said set time increment, and for generating multi-screen display enable signals in response to a user command;
    display control means for generating initial address signals representing beginning points for said stored frames as displayed on said display means; and
    addressing means for generating said addresses by incrementing said initial address signals.

11. A video color printer as claimed in claim 10, wherein time periods between consecutive said write enable signals is equal to said set time increment divided by a total number of said stored frames.

12. A video color printer as claimed in claim 10, wherein one of the displayed said stored frames is larger than remaining ones of the displayed said stored frames.

13. A video color printer as claimed in claim 10, wherein a first and larger one of the displayed frames is displayed in a center region of said display means while remaining ones of the displayed frames are displayed around a periphery of said larger one.

14. A method for displaying a multi-screen video image, said method comprising:
    checking for user selection of an automatic strobe key for enabling an automatic strobe mode during a multi-screen mode;
    if said automatic strobe mode and said multi-screen mode are enabled, displaying a plurality of selectable times and enabling user selection of one of said selectable times as a set time increment for said automatic strobe mode;
    receiving consecutive frames of video signals from a single video signal source and storing selected ones of said consecutive frames as stored frames, time periods between storage of successive ones of said stored frames being equal to said set time increment divided by a total number of said stored frames; and
    displaying said stored frames simultaneously as a multi-screen video image on a single video display, one of the displayed said stored frames being larger and displayed in a center portion of said single video display while remaining ones of the displayed said stored frames are displayed around a periphery of said larger one.

15. A video color printer, comprising:

memory means for storing frames of received video signals in response to write enable signals, and for providing the stored frames in response to read enable signals and addresses;

display means for displaying said stored frames provided by said memory means as a multi-screen display, one of the displayed said stored frames being larger and displayed in a center region of said display means while remaining ones of the displayed said stored frames are displayed around a periphery of said larger ones;

control means for receiving a user selected set time increment, for generating said write enable signals so that a time period between storage of consecutive ones of the stored frames by said memory means is said set time increment divided by a total number of said stored frames, and for generating multi-screen display enable signals in response to a user command;

display control means for generating initial address signals representing beginning points for said stored frames as displayed on said display means; and addressing means for generating said addresses by incrementing said initial address signals.

* * * * *

UNITED STATES PATENT AND TRADEMARK OFFICE
CERTIFICATE OF CORRECTION

PATENT NO. : 5,262,866
DATED : 16 November 1993
INVENTOR(S) : Seung-Ho Hong

It is certified that error appears in the above-indentified patent and that said Letters Patent is hereby corrected as shown below:

Column 1,

Line 62,    after "part 90", insert --in response to the multi-screen mode--;

Column 3,

Line 35,    change "invoked" to --enabled--; and

Column 4,

Line 42,    change "time" to --times--.

Signed and Sealed this

Twenty-third Day of August, 1994

Attest:

BRUCE LEHMAN

*Attesting Officer*      *Commissioner of Patents and Trademarks*